C. GORDON.
FLANGED PIPE.
APPLICATION FILED JAN. 16, 1908.
940,870.
Patented Nov. 23, 1909.
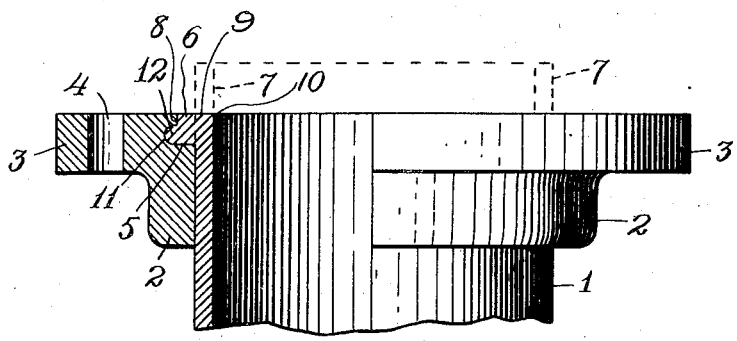
Witnesses
R. D. Totman.
Penelope Cumberbach
Inventor
Charles Gordon
By Rufus B. Fowler
Attorney

UNITED STATES PATENT OFFICE.

CHARLES GORDON, OF HARTFORD, CONNECTICUT, ASSIGNOR TO WHITLOCK COIL PIPE COMPANY, OF WEST HARTFORD, CONNECTICUT, A CORPORATION OF CONNECTICUT.

FLANGED PIPE.

940,870.          Specification of Letters Patent.     Patented Nov. 23, 1909.

Application filed January 16, 1908. Serial No. 411,097.

*To all whom it may concern:*

Be it known that I, CHARLES GORDON, a citizen of the United States, residing at Hartford, in the county of Hartford and State of Connecticut, have invented a new and useful Improvement in a Flanged Pipe, of which the following is a specification, accompanied by drawings, forming a part of the same, in which the figure is a sectional view of the flanged end of a pipe embodying my invention.

Similar reference figures refer to similar parts in the view.

Referring to the accompanying drawings 1 denotes the pipe, 2 a collar applied thereto, having a flange 3 in which bolt holes 4 are provided to enable the flanges of the pipes to be coupled together. The collar 2 is provided with an annular recess 5 adapted to receive a flange 6, formed by upsetting the end of the pipe. The metal at the end of the pipe which is upset to form the flange 6 is indicated in the drawings by broken lines 7, a sufficient amount of metal is upset to closely fill the annular recess 5. The flange 6 formed on the end of the pipe and integral therewith is compressed into the annular recess 5, and the flange 6 and collar 2 are then welded together at the contacting annular surface 8, securely uniting the pipe 1 and collar 2.

In carrying my invention into practice I apply the collar 2 in a heated state to the end of the pipe and perform the operation of upsetting the end of the pipe and welding the joint between the collar and flange 6, while the collar and the end of the pipe are both hot, causing the collar to be shrunk upon the end of the pipe in cooling. In forming the integral flange 6 upon the end of the pipe, I preferably bring the face 9 of the flange substantially into the plane of the face of the flange 3, and I also preferably form a right angled corner at 10, so that when the separate lengths of pipe are coupled together, no recesses or pockets will occur at the joints of the pipe.

By applying the welding process to the outer edge of the integral flange 6, I do not weaken the end of the pipe by any excessive heat employed in welding.

I also form a groove 11 in the inner wall of the annular recess 5, which may be of any desired shape in cross section, but preferably semicircular as shown. In the operation of upsetting the end of the pipe sufficient metal is forced into the groove 11 to substantially fill the same and form a rib 12 which resists any strain tending to move the collar longitudinally on the pipe.

The groove 11 is preferably formed at the bottom of the annular recess 5, so that, when semicircular in cross section, it will do away with the angular corner at the bottom of the recess and thereby facilitate the complete filling of the recess and groove by the metal as the end of the pipe is upset.

I claim:

1. A pipe having a flanged collar applied to its outer surface, said collar having an interior annular recess open at the top, with the lower wall of said recess at right angles to the axis of the pipe and wider than the opening at the top of said recess, and with the end of the pipe upset to form an exterior flange arranged to contact with the walls of said recess.

2. A pipe having a flanged collar applied to its outer surface, said collar having an interior annular recess open at the top, with its lower wall at right angles to the axis of said pipe, with its outer wall provided with a groove below the top, and with the pipe upset to form an exterior flange arranged to contact with the walls of said recess.

Dated this fourth day of January 1908.

CHARLES GORDON.

Witnesses:
ARTHUR T. HYDE,
J. B. MURPHY.